United States Patent
Park

(10) Patent No.: US 11,088,874 B2
(45) Date of Patent: Aug. 10, 2021

(54) VEHICLE AND IN-VEHICLE MESSAGE TRANSMISSION METHOD

(71) Applicants: Hyundai Motor Company, Seoul (KR); Kia Motors Corporation, Seoul (KR)

(72) Inventor: Pil Yong Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 48 days.

(21) Appl. No.: 16/663,209

(22) Filed: Oct. 24, 2019

(65) Prior Publication Data

US 2020/0344090 A1  Oct. 29, 2020

(30) Foreign Application Priority Data

Apr. 26, 2019 (KR) .................. 10-2019-0048952

(51) Int. Cl.
| | |
|---|---|
| *H04L 12/66* | (2006.01) |
| *H04L 12/40* | (2006.01) |
| *H04L 12/12* | (2006.01) |
| *H04L 29/06* | (2006.01) |

(52) U.S. Cl.
CPC .............. *H04L 12/66* (2013.01); *H04L 12/12* (2013.01); *H04L 12/40* (2013.01); *H04L 69/16* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| | | | |
|---|---|---|---|
| 10,116,462 B2* | 10/2018 | Balbierer | H04L 12/40136 |
| 2016/0191572 A1* | 6/2016 | Joy | H04L 12/413 |
| | | | 370/402 |
| 2018/0103121 A1* | 4/2018 | Yun | H04L 67/34 |
| 2018/0205414 A1* | 7/2018 | Tateishi | H04B 3/36 |
| 2019/0207862 A1* | 7/2019 | Kajio | H04L 67/12 |
| 2020/0252998 A1* | 8/2020 | Spapis | H04W 4/40 |

* cited by examiner

*Primary Examiner* — Noel R Beharry
*Assistant Examiner* — Keith Follansbee
(74) *Attorney, Agent, or Firm* — Morgan, Lewis & Bockius LLP

(57) ABSTRACT

An in-vehicle message transmission method includes receiving a network management (NM) message from a Controller Area Network (CAN) network, transmitting a wakeup pulse to an Ethernet network in response to the NM message, storing an Ethernet message into which a CAN message received from the CAN network is converted in a gateway, and transmitting the Ethernet message to an Ethernet node when a Transmission Control Protocol (TCP) connection with the Ethernet node to receive the Ethernet message is established.

16 Claims, 5 Drawing Sheets

VEHICLE AND IN-VEHICLE MESSAGE TRANSMISSION METHOD

CROSS-REFERENCE TO RELATED APPLICATION

This application claims the benefit of priority to Korean Patent Application No. 10-2019-0048952, filed in the Korean Intellectual Property Office on Apr. 26, 2019, the entire contents of which are incorporated herein by reference.

TECHNICAL FIELD

The present disclosure relates to a signal synchronization technique between a Controller Area Network (CAN) and an Ethernet network in a vehicle.

BACKGROUND

Recently, an internal network installed in vehicles is rapidly shifting from CAN communication to Ethernet communication of relatively high-speed. However, high cost and time may be required to change all the existing controllers to Ethernet communication-based controllers, and therefore, many vehicles today are being developed to have an environment in which Ethernet and CAN networks are mixed.

For this reason, gateways may be essential to vehicles and function to perform conversion between heterogeneous protocols according to a CAN communication method and an Ethernet communication method. However, an Ethernet controller may have a separate application processor (AP) and a complicated software stack (S/W stack), which makes a boot time considerably slower than a CAN controller. Therefore, when the gateway forwards a message to the Ethernet controller immediately when receiving the message from the CAN controller, missing of the message may occur due to the boot time of the Ethernet controller.

SUMMARY

The present disclosure has been made to solve the above-mentioned problems occurring in the prior art while advantages achieved by the prior art are maintained intact.

An aspect of the present disclosure provides a vehicle and an in-vehicle message transmission method capable of preventing a message omission phenomenon.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an in-vehicle message transmission method includes: receiving a network management (NM) message from a Controller Area Network (CAN) network; transmitting a wakeup pulse to an Ethernet network in response to the NM message; storing an Ethernet message into which a CAN message received from the CAN network is converted in a gateway; and transmitting the Ethernet message to an Ethernet node when a Transmission Control Protocol (TCP) connection with the Ethernet node to receive the Ethernet message is established.

According to another aspect of the present disclosure, a vehicle includes: a Controller Area Network (CAN) network including a plurality of CAN nodes; an Ethernet network including a plurality of Ethernet nodes which transmit and receive messages to and from the CAN nodes; and a gateway that receives a network management (NM) message from the CAN network, transmits a wakeup pulse to the Ethernet network in response to the NM message, stores an Ethernet message into which a CAN message received from the CAN network is converted, and transmits the Ethernet message to an Ethernet node when a Transmission Control Protocol (TCP) connection with the Ethernet node to receive the Ethernet message is established.

According to still another aspect of the present disclosure, a vehicle includes: a Controller Area Network (CAN) network including a plurality of CAN nodes; and a gateway that stores an Ethernet message for a predetermined period of time into which a CAN message received from the CAN network is converted, determines whether a Transmission Control Protocol (TCP) connection with an Ethernet node to receive the Ethernet message is established, and transmits the Ethernet message to the Ethernet node when the TCP connection is established.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
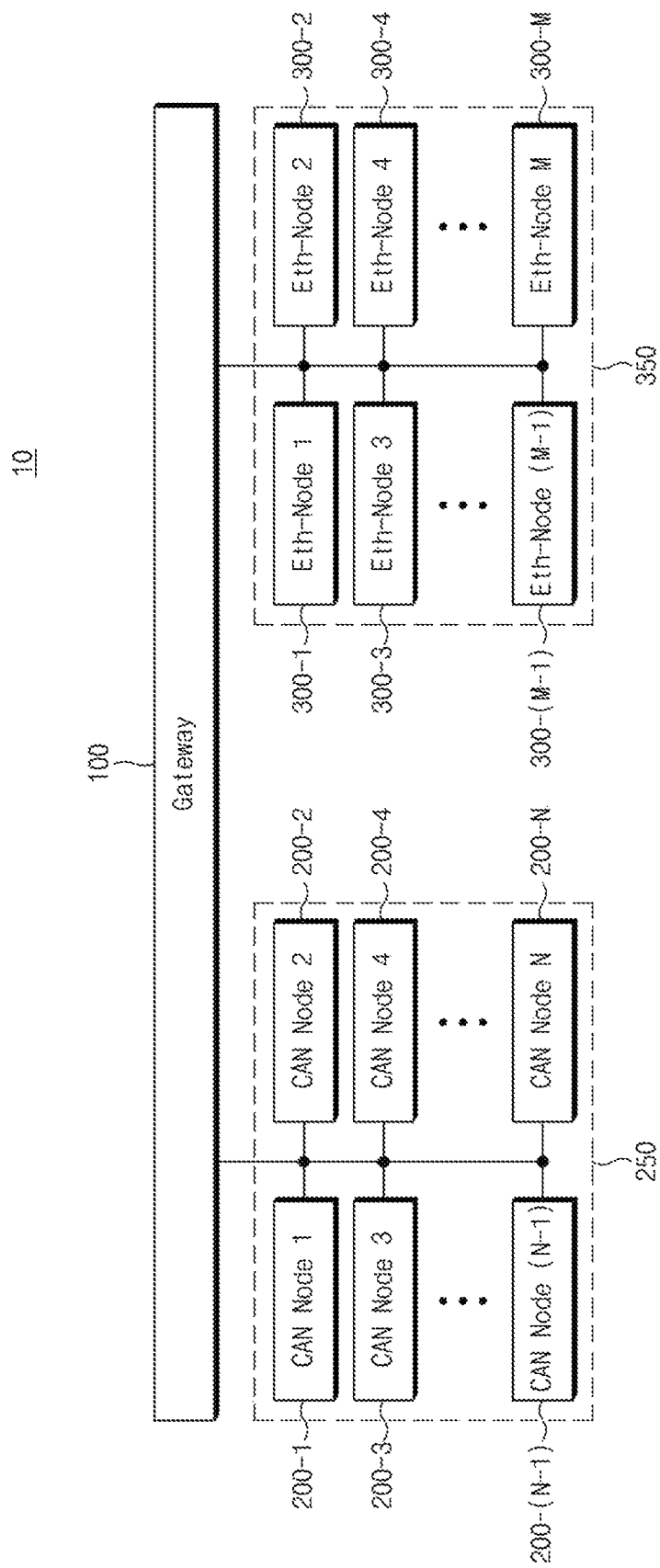
FIG. 1 is a simplified block diagram of a vehicle according to an exemplary embodiment of the present disclosure.

Hereinafter, exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a simplified block diagram of a vehicle according to an exemplary embodiment of the present disclosure.

Referring to FIG. 1, a vehicle 10 may include heterogeneous networks of a network using a Controller Area Network (CAN) communication method and a network using an Ethernet communication method, and prevent a message omission phenomenon due to a difference in startup (boot) time between a controller according to the CAN communication method and a controller according to an Ethernet communication method.

The vehicle 10 may include a gateway 100, a CAN network 250 and an Ethernet network 350. A configuration included in the vehicle 10 is a simplified representation of components necessary for describing one exemplary embodiment of the present disclosure, and other components may be added or omitted as necessary. Each component of the vehicle 10 illustrated in FIG. 1 may be implemented in hardware, software, or a combination thereof.

Although the vehicle 10 is illustrated as including two types of networks 250 and 350 in FIG. 1, the scope of the disclosure is not limited thereto, and the vehicle 10 may include three or more types of networks. In addition, the vehicle 10 may include a plurality of CAN networks, which are classified into two or more categories and respectively connected in independent topologies.

The gateway 100 may perform message conversion and transmission from one network to another to enable communication between the heterogeneous networks 250 and 350. Here, the conversion may mean converting a CAN-based communication protocol into an Ethernet-based communication protocol, or converting the Ethernet-based communication protocol into the CAN-based communication protocol. According to an exemplary embodiment, a switch for controlling an electrical connection between the gateway 100 and each of the networks 250 and 350 may be further included.

A more detailed configuration and operation of the gateway 100 will be described later with reference to FIG. 2.

The CAN network 250 may include a plurality of CAN nodes 200-1 to 200-N (where N is an integer of two or more). Although the CAN network 250 is used as an example in the present disclosure, the scope of the present disclosure is not limited thereto. The technical spirit of the present disclosure is also applicable to a vehicle network such as a LIN (local interconnect network), a FlexRay, a media oriented system transport (MOST), or the like.

Each of the CAN nodes 200-1 to 200-N may transmit and receive a message to and from another node using the CAN-based communication protocol. Therefore, messages transmitted and received by the CAN nodes 200-1 to 200-N are compliant with the CAN-based communication protocol. In this case, the another node may refer to a node connected to the same network 250 or a node connected to the heterogeneous network 350.

Each of the CAN nodes 200-1 to 200-N may mean an electronic control unit (ECU) for controlling various devices included in the vehicle 10. For example, each of the CAN nodes 200-1 to 200-N may control the operation of any one of an engine, a transmission, a power train, a braking device, a steering device, an airbag, a clutter, a door, a window and an infotainment.

Although the CAN nodes 200-1 to 200-N and the gateway 100 are illustrated as being connected in a bus topology in FIG. 1, the scope of the present disclosure is not limited thereto, and a star topology, a ring topology, a tree topology, a mesh topology, and the like may be employed.

The Ethernet network 350 may include a plurality of Ethernet nodes 300-1 to 300-M (where M is an integer of 2 or more).

Each of the Ethernet nodes 300-1 to 300-M may transmit and receive a message to and from another node using an Ethernet-based communication protocol. Therefore, messages transmitted and received by the Ethernet nodes 300-1 to 300-M are compliant with the Ethernet-based communication protocol. In this case, the another node may refer to a node connected to the same network 350 or a node connected to the heterogeneous network 250.

The Ethernet nodes 300-1 to 300-M may embody Electronic Control Units (ECUs) that respectively control various devices included in the vehicle 10. For example, each of the Ethernet nodes 300-1 to 300-M may control the operation of any one of an engine, a transmission, a power train, a braking device, a steering device, an airbag, a clutter, a door, a window and an infotainment.

Although the Ethernet nodes 300-1 to 300-M and the gateway 100 are illustrated as being connected in a bus topology in FIG. 1, the scope of the present disclosure is not limited thereto, and a star topology, a ring topology, a tree topology, a mesh topology, and the like may be employed.

Figure 2:
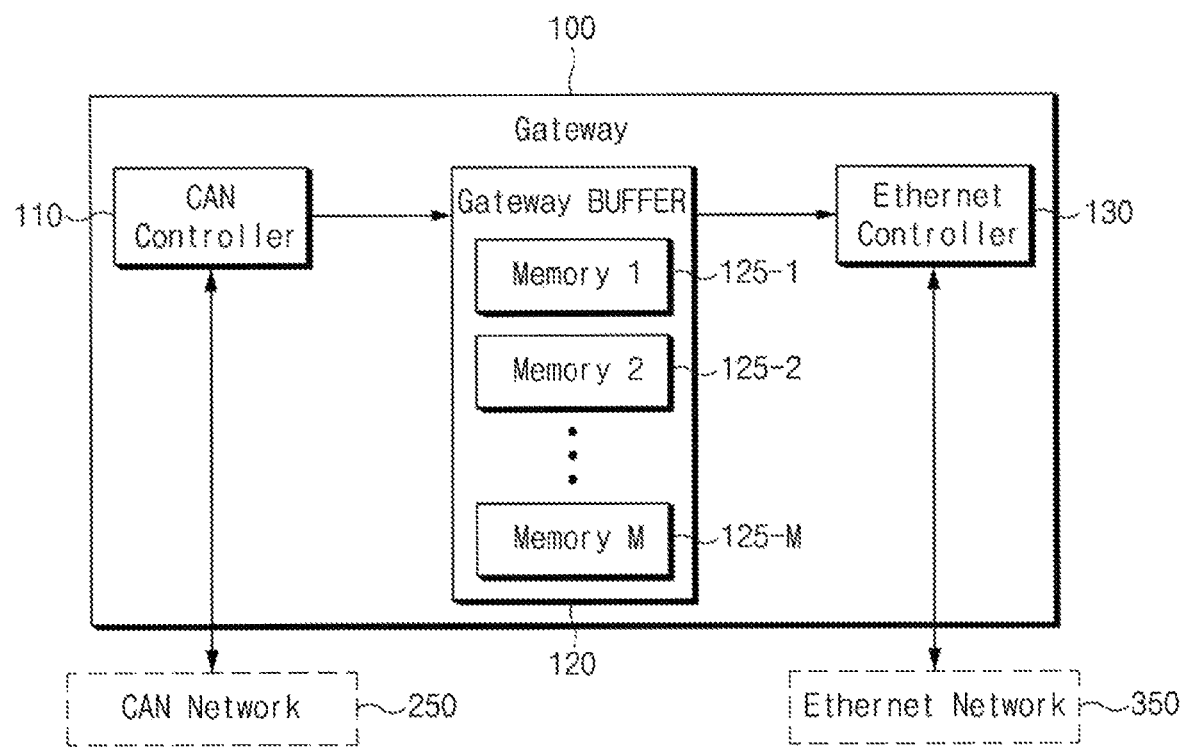
FIG. 2 is a diagram illustrating the gateway in FIG. 1 in more detail.

FIG. 2 is a diagram illustrating the gateway in FIG. 1 in more detail.

Referring to FIG. 2, the gateway 100 may include a CAN controller 110, a gateway buffer 120, and an Ethernet controller 130.

The CAN controller 110 may correspond to the CAN network 250 and transmit and receive CAN messages to and from the CAN network 250.

When the CAN nodes 200-1 to 200-N included in the CAN network 250 attempts to transmit a message to a specific Ethernet node 300-1 to 300-M included in the Ethernet network 350, the CAN nodes 200-1 to 200-N may generate a CAN message and transmit the CAN message to the gateway 100. The CAN message may include destination information for the specific Ethernet node 300-1 to 300-M and data to be transmitted.

The CAN controller 110 may identify the destination information included in the CAN message and convert the CAN message into the Ethernet-based communication protocol used in the Ethernet network 350 including the specific Ethernet node 300-1 to 300-M to generate an Ethernet message. The converted Ethernet message may be different from the CAN message only in the communication protocol and may include the destination information and the data to be transmitted for the specific Ethernet node 300-1 to 300-M like the CAN message.

The CAN controller 110 may forward the generated Ethernet message to the gateway buffer 120.

The CAN controller 110 may receive the CAN message to be transmitted from the Ethernet controller 130 to the CAN nodes 200-1 to 200-N and may transmit the CAN message to the CAN network 250.

The gateway buffer 120 may receive the Ethernet message from the CAN controller 110 and store the received Ethernet message in one of memories 125-1 to 125-M corresponding to the destination information. The destination information of the Ethernet message may correspond to any one of the Ethernet nodes 300-1 to 300-M of the Ethernet network 350. Each of the memories 125-1 to 125-M may correspond to the Ethernet nodes 300-1 to 300-M, respectively. For example, when the destination information of the Ethernet message indicates the third Ethernet node 300-3, the gateway buffer 120 may store a relevant Ethernet message in the third memory 125-3.

Each of the memories 125-1 to 125-M may be any one type of storage medium, among a flash memory, a hard disk, a solid state disk (SSD), a silicon disk drive (SDD), a random access memory (RAM), a Dynamic Random Access Memory (DRAM), a Synchronous Dynamic Random Access Memory (SDRAM), a static random access memory (SRAM), a read-only memory (ROM), an electrically erasable programmable read-only memory (EEPROM), a programmable read-only memory (PROM), a magnetic disk, and/or an optical disk. Each of the memories 125-1 to 125-M may be an independent memory chip or may be an independent storage area in a single memory chip.

According to an exemplary embodiment, the memories included in the gateway buffer 120 may not fixedly correspond but may dynamically correspond to the Ethernet nodes 300-1 to 300-M. For example, regardless of the destination information of Ethernet messages, the Ethernet messages may be stored in the first memory 125-1, the second memory 125-2, and the like in the order of reception thereof. In this case, the efficiency of the memory space utilization may be increased even when the frequency of occurrence of the Ethernet message to a specific Ethernet node is very high and the frequency of occurrence of the Ethernet message to some other Ethernet nodes is very low.

The Ethernet controller 130 may correspond to the Ethernet network 350 and transmit and receive Ethernet messages to and from the Ethernet network 350.

When the Ethernet nodes 300-1 to 300-M included in the Ethernet network 350 attempts to transmit a message to specific CAN node 200-1 to 200-N included in the CAN network 250, the Ethernet nodes 300-1 to 300-M may generate an Ethernet message and transmit the generated Ethernet message to the gateway 100. The Ethernet message may include destination information and data to be transmitted for the specific CAN nodes 200-1 to 200-N.

The Ethernet controller 130 may identify the destination information included in the Ethernet message, convert the Ethernet message according to the CAN-based communication protocol used in the CAN network 250 including the specific CAN node 200-1 to 200-N corresponding to the destination information to generate a CAN message. The converted CAN message may be different from the Ethernet message only in the communication protocol and may include the destination information and the data to be transmitted for the specific CAN node 200-1 to 200-N like the Ethernet message.

The Ethernet controller 130 may forward the generated CAN message to the CAN controller 110.

The Ethernet controller 130 may transmit Ethernet messages stored in first to M-th memories 125-1 to 125-M of the gateway buffer 120 to the corresponding Ethernet nodes 300-1 to 300-M. For example, the Ethernet controller 130 may transmit the Ethernet message stored in the second memory 125-2 to the second Ethernet node 300-2.

The Ethernet controller 130 may monitor whether or not the Ethernet message is stored in at least one of the first to M-th memories 125-1 to 125-M of the gateway buffer 120. According to another exemplary embodiment, the gateway buffer 120 may store an Ethernet message in at least one of the first to M-th memories 125-1 to 125-M, and notify the Ethernet controller 130 that the storage is completed.

When the Ethernet message is stored in at least one of the first to M-th memories 125-1 to 125-M, the Ethernet controller 130 may not immediately transmit the stored Ethernet message to the Ethernet network 350, and attempt to establish a Transmission Control Protocol (TCP) connection with an Ethernet node corresponding to the Ethernet message among the Ethernet node 300-1 to 300-M. Here, when the TCP connection is established, packets may be exchanged between the nodes (e.g., the Ethernet controller 130 and the Ethernet nodes 300-1 to 300-M). A more detailed description of the TCP connection will be given later with reference to FIG. 4.

After completing the TCP connection with the Ethernet node corresponding to the Ethernet message among the Ethernet nodes 300-1 to 300-M, the Ethernet controller 130 may transmit the corresponding Ethernet message to the Ethernet network 350 to allow the Ethernet message to be received by the corresponding Ethernet node 300-1 to 300-M.

When the transmission of the Ethernet message by the Ethernet controller 130 is completed, the gateway buffer 120 may delete the corresponding Ethernet message from the first to M-th memories 125-1 to 125-M.

Figure 3:
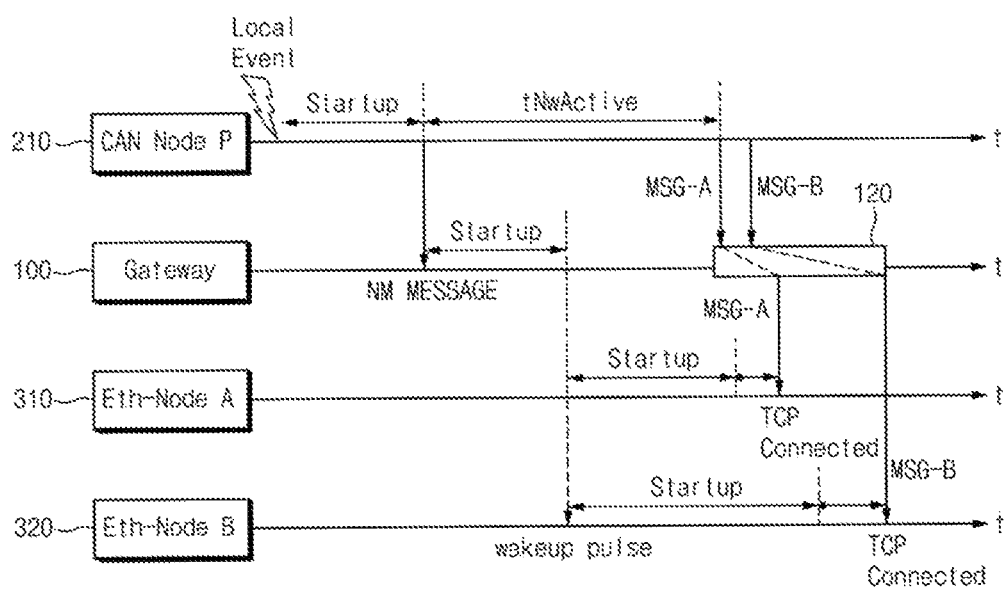
FIG. 3 is a diagram for describing a method for forwarding a message between heterogeneous networks in the vehicle illustrated in FIG. 1.

FIG. 3 is a diagram for describing a method for forwarding a message between heterogeneous networks in the vehicle illustrated in FIG. 1.

Referring to FIG. 3, a process to process a local event is illustrated, in which a CAN node P (P is any one of 1 to N) 210 transmits a message A MSG-A and a message B MSG-B to an Ethernet node A (A is any one of 1 to M) 310 and an Ethernet node B (B is any one of 1 to M) 320, respectively through the gateway 100.

Each communication node (the gateway, the CAN node or the Ethernet node) included in the vehicle 10 may have operation modes of a sleep mode and a normal mode. The sleep mode may refer to a state in which only a minimum configuration capable of detecting a local event or receiving and processing a wakeup signal is activated, and the normal mode may refer to a state capable of processing an entire function of a relevant communication node. Here, when the communication node in the sleep mode receives a wakeup signal or detects a local event, the communication node may transition to the normal mode via a system booting procedure. The local event may refer to an internal mode transition request of the communication node (e.g., user request, impact detection, or the like), and the wakeup signal may refer to an external mode transition request. The wakeup signal may include a network management (NM) message or a wakeup pulse.

The NM message may include a source information field, a network status information field, and a wakeup information field. The source information field may include an identifier (e.g., a network address) of a communication node that has generated the NM message. The network status information field may include information on the status of a communication node that has transmitted the NM message. The wakeup information field may include information on a cause of wakeup and a time required for performing an operation according to the cause of wakeup.

The wakeup pulse may refer to an electrical pulse having a predetermined voltage intensity and pattern.

The CAN node P 210, which has detected the local event, may transition from the sleep mode to the normal mode through the system booting procedure. Hereinafter, the time required for the system booting procedure in each communication mode is defined as a startup time.

The CAN node P 210 may transition to the normal mode and immediately transmit an NM message to the gateway 100 in response to the detection of the local event, and the gateway 100, which has received the NM message, may transition from the sleep mode to the normal mode through the system booting procedure.

After transitioning to the normal mode, the gateway 100 may transmit a wakeup pulse to the Ethernet node A 310 and the Ethernet node B 320 in response to the NM message.

The Ethernet node A 310 and the Ethernet node B 320, which have received the wakeup pulse, may perform the system booting procedure to transition from the sleep mode to the normal mode in response to the wakeup pulse individually.

An Ethernet node may have a relatively long startup time compared to a CAN node due to the fact that it has a complicated software stack and a separate application processor (AP) compared to the CAN node.

When a predetermined network activation time tNwActive has elapsed after the CAN node P 210 transitions to the normal mode, the CAN node P 210 may transmit the message A MSG-A and the message B MSG-B to the gateway 100 sequentially. The CAN node P 210 may be a controller compliant to a general CAN communication protocol. According to the general CAN communication protocol, the CAN node P 210 may transmit a message to another communication node after the lapse of the predetermined network activation time tNwActive determined in consideration of a startup time of a general CAN node and a gateway. However, there is a possibility that the message, which is transmitted after the lapse of the predetermined network activation time tNwActive determined considering the startup time of a general CAN node and a gateway, may not be received because the Ethernet node has a longer startup time than the CAN node. Such a message omission may cause a serious error in the operation of the vehicle 10, and may threaten the safety of the driver depending on a type of the message.

The gateway 100 may include the gateway buffer 120 and the gateway buffer 120 may include a memory corresponding to each of the Ethernet nodes 310 and 320. The gateway 100 may store the message A MSG-A and the message B MSG-B sequentially received from the CAN node P 210 in memories respectively corresponding to the Ethernet nodes 310 and 320.

The gateway 100 may attempt to establish a TCP connection with each of the Ethernet nodes 310 and 320 which have transitioned to the normal mode.

When the TCP connection with the Ethernet node A 310 is established, the gateway 100 may transmit the message A MSG-A to the Ethernet node A 310.

When the TCP connection with the Ethernet node B 320 is established, the gateway 100 may transmit the message B MSG-B to the Ethernet node B 320.

That is, the gateway 100 may transmit the message A MSG-A and the message B MSG-B to the Ethernet node A 310 and the Ethernet node B 320, respectively in the order in which the TCP connections with the Ethernet node A 310 and the Ethernet node B 320 are established, regardless of the time at or order in which the message A MSG-A and the message B MSG-B are received.

For example, even when the message A MSG-A and the message B MSG-B are sequentially received as illustrated in FIG. 3, the TCP connection with the Ethernet node B 320 is established earlier than the TCP connection with the Ethernet node A 310, the transmission of the message B MSG-B to the Ethernet node B 320 may be performed first, unlike in FIG. 3.

When the gateway 100 does not include the gateway buffer 120 and forwards the message A MSG-A and the message B MSG-B to the Ethernet node A 310 and the Ethernet node B 320 immediately when they are received, the Ethernet node A 310 and the Ethernet node B 320 may be in a state in which the system booting procedure is not completed or the TCP connection is not established, thus causing the Ethernet node A 310 and the Ethernet node B 320 not to normally receive the message A MSG-A and the message B MSG-B, and therefore leading to message omission.

As a method for preventing a message omission, there may be considered a method for temporarily storing a received message in a buffer included in a gateway and, when a time required for all of Ethernet nodes to complete a system booting procedure and a TCP connection has elapsed, transmitting a message to the Ethernet node. However, according to this method, an Ethernet node in which the system booting procedure has been completed and the TCP connection has been established early may have a problem that message processing is delayed due to an Ethernet node in which the system booting procedure has been completed and the TCP connection has been established lately, because the each Ethernet node may have different startup time.

However, in the vehicle 10 according to the embodiment of the present disclosure, the gateway 100 may temporarily store a message received from the CAN node, and forward the temporarily stored message to the relevant Ethernet node after the TCP connection with the Ethernet node to receive the message has been established, thus achieving forwarding of the message to the relevant Ethernet node without message omission.

Further, the specific Ethernet node may receive the corresponding message immediately after the startup time and the time required for the TCP connection have elapsed, thus solving the problem that the message processing is delayed. That is, the specific Ethernet node may receive the message immediately after the startup time and the time required for the TCP connection have elapsed from the time when the wakeup pulse is received.

Figure 4:
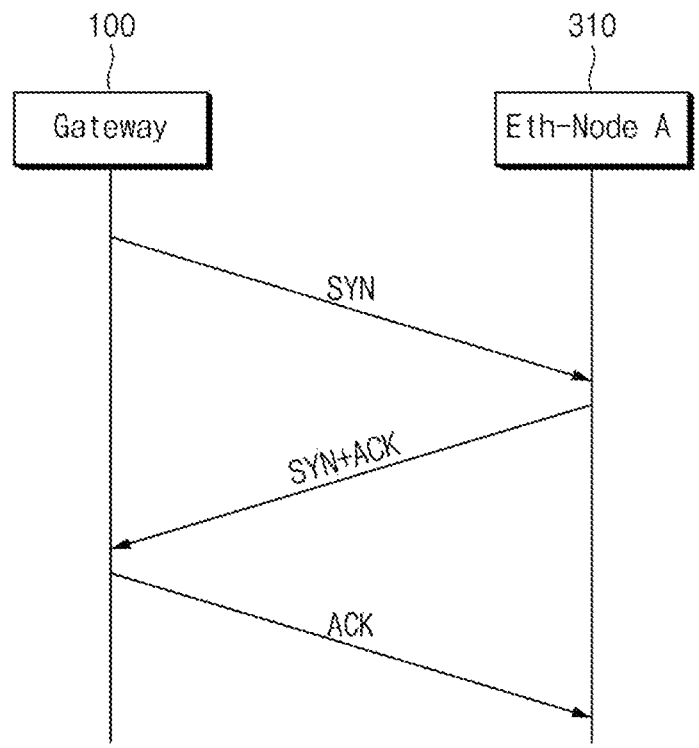
FIG. 4 is a diagram for describing a Transmission Control Protocol (TCP) connection process described with reference to FIG. 3 in more detail.

FIG. 4 is a diagram for describing a TCP connection process described with reference to FIG. 3 in more detail.

Referring to FIG. 4, the TCP connection will be described by taking, as an example, the TCP connection between the gateway 100 and the Ethernet node A 310. This TCP connection process may be applied substantially equally to the TCP connection between the other communication nodes in the vehicle 10. TCP connection may refer to an operation of establishing a session in advance to establish a logical connection between communication nodes to ensure accurate data transmission.

Prior to a TCP connection, a TCP client's port is closed and a TCP server's port is listening.

The gateway 100, which is the TCP client, may transmit synchronize sequence numbers (SYN) data (or a first connection request) to the Ethernet node A 310, which is the TCP server, to make a connection request.

The Ethernet node A 310 may receive the SYN data and generate a first response ACK indicating that the SYN data has been normally received in response to the SYN data and a SYN data (or a second connection response) requesting the gateway 100 to open a relevant port, together.

The gateway 100 may receive the SYN data and the first response ACK, switch to a port connection state ESTABLISHED, and transmit the second response ACK indicating that the SYN data is normally received in response to the SYN data, to the Ethernet node.

The Ethernet node A 310 receiving the second response ACK may switch to the port connection state ESTABLISHED.

Thus, when the gateway 100 and the Ethernet node A 310 both switch to the port connection state ESTABLISHED, the TCP connection between the gateway 100 and the Ethernet node A 310 is established.

Figure 5:
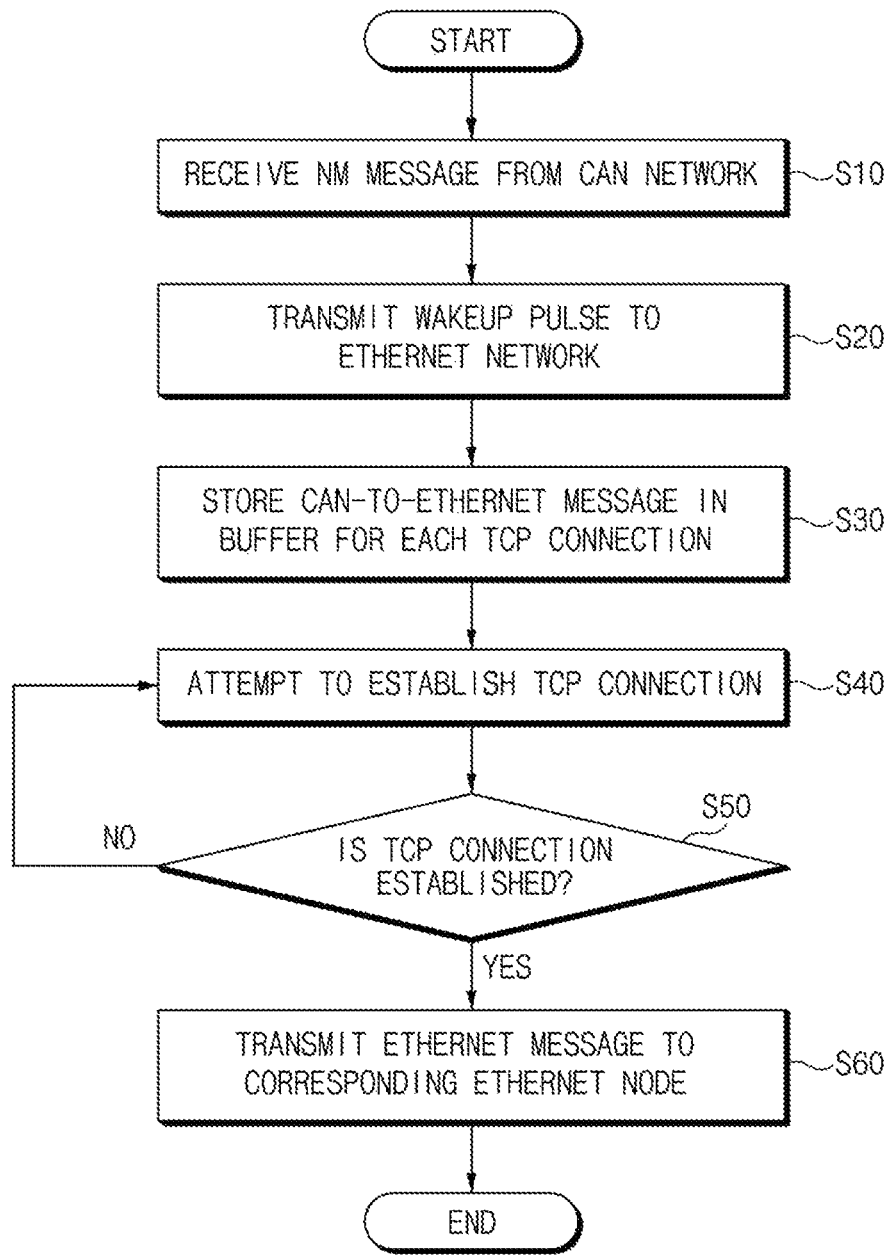
FIG. 5 is a flowchart of an in-vehicle message transmission method according to an exemplary embodiment of the present disclosure.

FIG. 5 is a flowchart of an in-vehicle message transmission method according to an exemplary embodiment of the present disclosure.

Referring to FIG. 5, the in-vehicle message transmission method will be described with reference to the operation of the gateway 100.

The gateway 100 may receive an NM message from the CAN network 250 (S10). The NM message may be generated by a CAN node which has detected a local event and has completed a system booting procedure, among the CAN nodes 200-1 to 200-N included in the CAN network 250.

When the gateway 100 has completed the system booting procedure in response to the NM message, the gateway 100 may transmit a wakeup pulse to the Ethernet network 350 (S20). The Ethernet node 300-1 to 300-M receiving the wakeup pulse may perform the system booting procedure in response to the wakeup pulse.

The gateway 100 may receive the CAN message to be transmitted to the Ethernet node 300-1 to 300-M from the CAN network 250, convert the CAN message into an Ethernet message, and then store the converted Ethernet message (i.e., CAN to Ethernet Message or heterogeneous network message) in the gateway buffer 120 for each Ethernet node (or TCP connection) (S30).

When the Ethernet message is stored in the gateway buffer 120, the gateway 100 may attempt a TCP connection with the Ethernet node corresponding to the Ethernet message (S40).

The gateway 100 may determine whether or not the TCP connection with the Ethernet node corresponding to the Ethernet message is established (S50), and attempt the TCP connection until the TCP connection with a corresponding Ethernet node is established (NO in S50).

When the TCP connection with the corresponding Ethernet node is established (YES in S50), the gateway 100 may transmit the Ethernet message temporarily stored in the gateway buffer 120 to the corresponding Ethernet node (S60).

As described above, according to the vehicle 10 according to the embodiment of the present disclosure, it is possible to prevent a message from missing due to a difference in startup time between the controller according to the CAN communication method and the controller according to the Ethernet communication method.

This effect can be obtained only by modifying the software for the operation of the gateway 100 without adding or changing hardware by utilizing the memory included in the gateway 100.

The operations of the method or the algorithm described in connection with the embodiments disclosed herein may be embodied directly in hardware or a software module executed by the processor, or in a combination thereof. The software module may reside on a storage medium such as a RAM, a flash memory, a ROM, an EPROM, an EEPROM, a register, a hard disk, a removable disk, and a CD-ROM. The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

According to the vehicle and the in-vehicle message transmission method according to an exemplary embodiment of the present disclosure, it is possible to prevent message missing phenomenon due to a difference in startup time between a CAN communication-based controller and an Ethernet communication-based controller.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An in-vehicle message transmission method comprising:
    receiving a network management (NM) message from a Controller Area Network (CAN) network;
    transmitting a wakeup pulse to an Ethernet network in response to the NM message;
    storing an Ethernet message into which a CAN message received from the CAN network is converted in a gateway; and
    transmitting the Ethernet message to an Ethernet node when a Transmission Control Protocol (TCP) connection with the Ethernet node to receive the Ethernet message is established,
    wherein the NM message and the CAN message are generated by a CAN node which is included in the CAN network and has detected a local event, and
    wherein the CAN node performs a system booting procedure when the local event is detected, transmits the NM message immediately when the system booting procedure is completed, and transmits the CAN message when a predetermined network activation time has elapsed.

2. The in-vehicle message transmission method of claim 1, wherein the storing an Ethernet message includes storing the Ethernet message for each Ethernet node included in the Ethernet network.

3. The in-vehicle message transmission method of claim 1, wherein the transmitting the Ethernet message to an Ethernet node includes transmitting the Ethernet message to the Ethernet node in an order in which the TCP connection is established.

4. The in-vehicle message transmission method of claim 1, wherein the transmitting the Ethernet message to an Ethernet node includes:
    transmitting, by the gateway, a first connection request to the Ethernet node;
    transmitting, by the Ethernet node, a first response responding to the first connection request and a second connection request to the gateway; and transmitting, by the gateway, a second response responding to the second connection request to the Ethernet node.

5. The in-vehicle message transmission method of claim 1, wherein, when the Ethernet message includes a plurality of Ethernet messages stored in the gateway, the Ethernet messages are transmitted in an order in which the TCP connection is established, regardless of an order in which the Ethernet messages are stored in the gateway.

6. The in-vehicle message transmission method of claim 1, wherein the Ethernet node receives the Ethernet message immediately after a startup time according to the wakeup pulse and a time required for the TCP connection have elapsed from a time when the wakeup pulse is received.

7. A vehicle comprising:
a Controller Area Network (CAN) network including a plurality of CAN nodes;
an Ethernet network including a plurality of Ethernet nodes which transmit and receive messages to and from the CAN nodes; and
a gateway configured to:
receive a network management (NM) message from the CAN network,
transmit a wakeup pulse to the Ethernet network in response to the NM message,
store an Ethernet message into which a CAN message received from the CAN network is converted, and
transmit the Ethernet message to an Ethernet node when a Transmission Control Protocol (TCP) connection with the Ethernet node to receive the Ethernet message is established,
wherein the gateway includes:
a CAN controller configured to convert the CAN message into the Ethernet message;
a gateway buffer configured to store the Ethernet message into which the CAN message is converted; and
an Ethernet controller configured to transmit the Ethernet message stored in the gateway buffer to the Ethernet node, and
wherein the gateway buffer includes a plurality of memories corresponding to the plurality of Ethernet nodes, respectively.

8. The vehicle of claim 7, wherein the gateway stores the Ethernet message for each Ethernet node included in the Ethernet network.

9. The vehicle of claim 7, wherein the NM message and the CAN message are generated by a CAN node which detects a local event.

10. The vehicle of claim 9, wherein the CAN node performs a system booting procedure when the local event is detected, transmits the NM message immediately when the system booting procedure is completed, and transmits the CAN message when a predetermined network activation time has elapsed.

11. The vehicle of claim 7, wherein the gateway transmits the Ethernet message to the Ethernet node in an order in which the TCP connection is established.

12. The vehicle of claim 7 wherein the gateway transmits the Ethernet message by:
transmitting a first connection request to the Ethernet node,
transmitting a first response responding to the first connection request and a second connection request to the gateway, by the Ethernet node, and
transmitting a second response responding to the second connection request to the Ethernet node.

13. The vehicle of claim 7, wherein, when the Ethernet message includes a plurality of Ethernet messages stored in the gateway, the Ethernet messages are transmitted in an order in which the TCP connection is established, regardless of an order in which the Ethernet messages are stored in the gateway.

14. The vehicle of claim 7, wherein the Ethernet node receives the Ethernet message immediately after a startup time according to the wakeup pulse and a time required for the TCP connection have elapsed from a time when the wakeup pulse is received.

15. The vehicle of claim 7, wherein the gateway buffer deletes the Ethernet message when transmission of the Ethernet message is completed.

16. A vehicle comprising:
a Controller Area Network (CAN) network including a plurality of CAN nodes; and
a gateway configured to:
store an Ethernet message for a predetermined period of time into which a CAN message received from the CAN network is converted,
determine whether a Transmission Control Protocol (TCP) connection with an Ethernet node to receive the Ethernet message is established, and
transmit the Ethernet message to the Ethernet node when the TCP connection is established,
wherein the gateway includes:
a CAN controller configured to convert the CAN message into the Ethernet message;
a gateway buffer configured to store the Ethernet message into which the CAN message is converted; and
an Ethernet controller configured to transmit the Ethernet message stored in the gateway buffer to the Ethernet node, and
wherein the gateway buffer includes a plurality of memories corresponding to the plurality of Ethernet nodes, respectively.

* * * * *